(12) United States Patent
Pathikulangara et al.

(10) Patent No.: US 10,237,095 B2
(45) Date of Patent: Mar. 19, 2019

(54) LINEAR EQUALIZATION FOR USE IN LOW LATENCY HIGH SPEED COMMUNICATION SYSTEMS

(71) Applicant: Commonwealth Scientific and Industrial Research Organisation, Campbell, ACT (AU)

(72) Inventors: Joseph Pathikulangara, Ermington (AU); David Humphrey, Carlingford (AU); Xiaojing Huang, North Ryde (AU); Jian Zhang, Denistone East (AU); Valeriy Dyadyuk, Cremorne (AU)

(73) Assignee: Commonwealth Scientific and Industrial Research Organisation, Acton, ACT (AU)

(*) Notice: Subject to any disclaimer, the term of this patent is extended or adjusted under 35 U.S.C. 154(b) by 0 days.

(21) Appl. No.: 15/512,884

(22) PCT Filed: Sep. 22, 2015

(86) PCT No.: PCT/AU2015/000579
§ 371 (c)(1),
(2) Date: Mar. 21, 2017

(87) PCT Pub. No.: WO2016/044877
PCT Pub. Date: Mar. 31, 2016

(65) Prior Publication Data
US 2017/0302482 A1    Oct. 19, 2017

(30) Foreign Application Priority Data
Sep. 22, 2014   (AU) .............................. 2014903778

(51) Int. Cl.
*H04L 27/28*    (2006.01)
*H04L 25/03*    (2006.01)
(Continued)

(52) U.S. Cl.
CPC .... *H04L 25/03057* (2013.01); *H04L 25/0226* (2013.01); *H04L 25/03038* (2013.01);
(Continued)

(58) Field of Classification Search
CPC ......... H04L 25/03057; H04L 25/03343; H04L 25/0226; H04L 25/03885; H04L 25/03834
See application file for complete search history.

(56) References Cited

U.S. PATENT DOCUMENTS 8,265,096 B2   9/2012   Zheng et al.
8,369,425 B2   2/2013   Bai et al.
(Continued)

FOREIGN PATENT DOCUMENTS

CN   101300871 A   11/2008
CN   101558608 A   10/2009
(Continued)

OTHER PUBLICATIONS

Australian Patent Office, Patent Examination Report No. 1 in AU Applicaiton No. 2012395740, dated Nov. 23, 2016 (2 pages).
(Continued)

*Primary Examiner* — Dac V Ha
(74) *Attorney, Agent, or Firm* — Wood Herron & Evans LLP

(57) ABSTRACT

A communication system including a transmitter and a receiver is disclosed. The transmitter transmits frames, at least two consecutive frames containing different training sequences. The receiver receives data communicated from the transmitter over a channel. The receiver combines and jointly processes the at least two consecutive frames transmitted by the transmitter to estimate a channel state of the channel.

15 Claims, 15 Drawing Sheets

(51) Int. Cl.
*H04L 25/02* (2006.01)
*H04L 27/26* (2006.01)
*H04L 27/38* (2006.01)

(52) U.S. Cl.
CPC .. *H04L 25/03133* (2013.01); *H04L 25/03343* (2013.01); *H04L 25/03834* (2013.01); *H04L 25/03885* (2013.01); *H04L 27/2613* (2013.01); *H04L 27/3863* (2013.01)

(56) References Cited

U.S. PATENT DOCUMENTS

| | | |
|---|---|---|
| 9,084,260 B2 | 7/2015 | Maltsev et al. |
| 2006/0078058 A1 | 4/2006 | Lin |
| 2008/0205569 A1 | 8/2008 | Kwak |
| 2009/0141824 A1* | 6/2009 | Xia ............... H04B 7/0417 375/267 |
| 2010/0323685 A1 | 12/2010 | Lopez et al. |
| 2010/0329374 A1* | 12/2010 | Pi ............... H04L 5/0007 375/260 |
| 2012/0063503 A1* | 3/2012 | Chen ............... H04L 25/0226 375/231 |
| 2012/0213255 A1* | 8/2012 | Stadelmeier ......... H04L 5/005 375/219 |
| 2013/0343211 A1 | 12/2013 | Liu et al. |
| 2015/0305026 A1 | 10/2015 | Liu et al. |
| 2017/0295003 A1* | 10/2017 | Yun ............... H04L 5/0048 |

FOREIGN PATENT DOCUMENTS

| | | |
|---|---|---|
| CN | 102318206 A | 1/2012 |
| CN | 101360077 | 10/2012 |
| EP | 0048475 A1 | 3/1982 |
| EP | 1953982 B1 | 8/2008 |
| EP | 1953982 B1 | 4/2011 |
| EP | 2378730 A1 | 10/2011 |
| WO | 2010093862 A1 | 8/2010 |

OTHER PUBLICATIONS

Australian Patent Office, Patent Examination Report No. 2 for standard patent application in AU Applicaiton No. 2012395740, dated Mar. 22, 2017 (3 pages).

Australian Patent Office, Patent Examination Report No. 3 for standard patent application in AU Applicaiton No. 2012395740, dated May 31, 2017 (4 pages).

European Patent Office, Extended Search Report issued in EP Applicaiton No. 12889293.2-1851, dated Jun. 14, 2016 (6 pages).

International Searching Authority, Search Report and Written Opinion issued in International Applicaiton No. PCT/AU2012/001470, dated Feb. 11, 2013 (10 pages).

Australian Patent Office, International Search Report (Form PCT/ISA/210, 6 pgs.) dated Dec. 10, 2015.

* cited by examiner

| $f_o(n)$ | $f_e(n)$ | $f_o(n+1)$ | $f_e(n+1)$ | ... |

Fig. 3A

| $f_o(n)$ | Odd preamble | PHY header and data payload |
| | ← *VaryTxEqz* applied. → |

| $f_e(n)$ | Even preamble | PHY header and data payload |
| | *FixedTxEqz* applied. | ← *VaryTxEqz* applied. → |

Fig. 3B

LINEAR EQUALIZATION FOR USE IN LOW LATENCY HIGH SPEED COMMUNICATION SYSTEMS

TECHNICAL FIELD

The present invention relates generally to digital communication over a channel and, in particular, to linear equalizers used in a low latency high speed communication system.

BACKGROUND

Wireless communications in millimeter wavelength frequency bands, such as the E-band (71-76 GHz and 81-86 GHz), typically have data rates in the order of Giga bits per second (Gbps). At such high data rates, mitigating Intersymbol Interference (ISI) caused by radio signal multipath propagation in a wireless channel, and signal reflection caused by connecting cables, is always a significant technical challenge.

Orthogonal frequency division multiplexing (OFDM) and its variants, such as single carrier with frequency domain equalization (SC-FDE), typically cope with large multipath delay spreads in broadband communications. However, equalization of OFDM signals in the frequency domain introduces large processing delays, and the spectrum efficiency is also reduced due to the use of guard intervals.

A single carrier system with advanced equalizers, such as a decision-feedback equalizer, is another option for coping with ISI. However, for high speed systems which demand very high clock rates in firmware implementations, such equalization cannot be performed at sufficiently high speeds to satisfy the data rate requirements. Therefore, a single carrier system with linear equalization becomes the only viable solution to ISI mitigation for high speed systems, when low processing delay is demanded.

Transmitter side equalization, which is referred to as pre-equalization hereafter, is efficient in reducing the implementation complexity and noise enhancement effect associated with receiver side linear equalization. Generally, a linear equalizer needs to have a long impulse response to equalize a linear channel with even a short delay spread, which implies that the equalization complexity will generally be very high if the equalization is implemented at the receiver. Such equalization can also cause a significant noise enhancement effect. Shifting such equalization from the receiver to the transmitter (i.e., pre-equalization) can significantly reduce the implementation complexity and latency by using predefined lookup tables created based on a predefined signal constellation. The noise enhancement effect can also be mitigated as the signal to noise ratio at the transmitter is much larger compared to that at the receiver.

More generally, both pre-equalization at the transmitter side and equalization at the receiver side are implemented at the same time. In one approach, the impulse response of the communications channel is factorized as a product of two impulse responses, and each is compensated for by either transmitter or receiver equalization. However, very complex computations are required for such factorization. In another aspect, channel equalization is mainly implemented at the transmitter, and receiver side equalization is only used to deal with residual channel effects after pre-equalization at the transmitter.

Coefficients used in the pre-equalization at the transmitter need to be generated using, for example, the impulse response of the channel estimated at the receiver. However, when channels are time varying, a mechanism is required to track the channel variation and update the equalization coefficients. Typically, pre-equalized or non-pre-equalized training sequences are used for estimating the impulse response of the channel, and generating the equalization coefficients at both transmitter and receiver.

The impulse response of the channel is typically estimated in the frequency domain due to its low complexity. When a pre-equalized training sequence is used, in the frequency domain, the received signal at one frequency point can be represented as $y=hpx+n$, where y is the received signal, h is the channel response, p is the pre-equalizer coefficient, x is the training signal, and n is the noise. The receiver equalizer coefficient can be generated by treating hp as a combined channel response, while the transmitter pre-equalization coefficient needs to be determined through the channel response h, which can be obtained by removing the pre-equalizer coefficient p from the estimate of the combined channel response hp. When non-pre-equalized training sequences are used, the received signal is $y=hx+n$, and the estimation of the receiver side equalization coefficient needs to combine the pre-equalizer p with the estimate of the channel response h. In either case, the receiver needs to know when the pre-equalization coefficients are updated. Estimation performance is also affected by using non-constant magnitude training signals in the frequency domain in the case of using pre-equalized training and by a doubled noise effect by combining the estimate of the impulse response of a noisy channel and the pre-equalizer in the case of using the non-pre-equalized training sequence.

In existing systems, these training sequences in every frame are generally identical. If multiple training sequences are required, they are concatenated in the preamble of a frame. However, long preamble causes long delay.

In-phase and quadrature (I/Q) imbalance is another significant concern for a wireless system with I/Q modulation architecture, i.e., the baseband signal is modulated onto (or demodulated from) an intermediate frequency (IF) or a radio frequency (RF) carrier through two separate in-phase (I) and quadrature (Q) channels. Due to the difference between the I and Q channel transmission characteristics (therefore termed I/Q imbalance or mismatch), the signal will be distorted if such impairment exists at the transmitter and/or receiver side(s). If the signal bandwidth is large, the I/Q imbalance is also frequency dependent (i.e., the I/Q imbalance is different at different frequencies throughout the bandwidth).

There are a number of techniques found in the prior art for I/Q imbalance compensation. Most of those techniques deal with I/Q imbalance compensation at the receiver side only, whereas both transmitter and receiver side imbalances exist at the same time in real systems. Estimating and compensating for both transmitter and receiver side imbalance are very challenging as the imbalance signals are entangled and therefore generally complex to separate them to achieve good estimation. Existing approaches typically require offline calibration to obtain the estimate for the transmitter side mismatch, and then estimate the receiver side mismatch using the received signal. However, this calibration will interrupt the normal operation, and is infeasible in continuous transmission systems such as backhaul systems. A limited number of approaches propose to jointly estimate the transmitter and receiver side mismatches, however, their complexity is very high which makes them impractical for implementation in real hardware.

A need therefore exists for alternative equalizers for use in a low latency high speed communication system.

SUMMARY

It is an object of the present invention to substantially overcome, or at least ameliorate, one or more disadvantages of existing arrangements.

According to a first aspect of the present disclosure, there is provided a communication system comprising:
- a transmitter for transmitting frames, at least two consecutive frames containing different training sequences; and
- a receiver for receiving data communicated from the transmitter over a channel, the receiver combining and jointly processing the at least two consecutive frames transmitted by the transmitter to estimate a channel state of the channel.

According to a second aspect of the present disclosure, there is provided a method for performing equalization in a communication system, the method comprising the steps of:
- applying equalization to at least a first training sequence by a time variable linear equalizer of a transmitter to produce an equalized first training sequence;
- transmitting by the transmitter the equalized first training sequence to a receiver over a channel;
- applying equalization to the equalized first training sequence by a receiver linear equalizer to produce first data;
- estimating equalization coefficients to be used by the receiver linear equalizer in future equalization from the first data;
- applying equalization to a second training sequence by a fixed linear equalizer of the transmitter to produce an equalized second training sequence;
- transmitting by the transmitter the equalized second training sequence to the receiver over the channel;
- estimating a channel state of the channel in the receiver from the equalized second training sequence;
- feeding back the channel state to the transmitter from the receiver; and
- estimating from the channel state equalization coefficients to be used for generating the coefficients of the time variable linear equalizer in future equalization.

According to a third aspect of the present disclosure, there is provided a transmitter comprising:
- a time variable linear equalizer for applying equalization to a first training sequence and a data payload; and
- a fixed linear equalizer for applying equalization to a second training sequence.

Other aspects of the invention are also disclosed.

BRIEF DESCRIPTION OF THE DRAWINGS

One or more embodiments of the present invention will now be described with reference to the drawings, in which:

FIGS. 3A and 3B illustrate a sequence of odd and even data frames, and the contents of those data frames;

DESCRIPTION OF EMBODIMENTS

Disclosed herein is a method and apparatus for realizing a high speed low latency full duplex wireless point-to-point link. This includes transmitting one or more training sequences, performing channel estimation and equalization, channel feedback, transmitter and receiver filters, and applying transmitter and receiver filtering to a data payload in a particularly configured frame structure. I/Q imbalance estimation and compensation are also optionally performed.

Figure 1A:
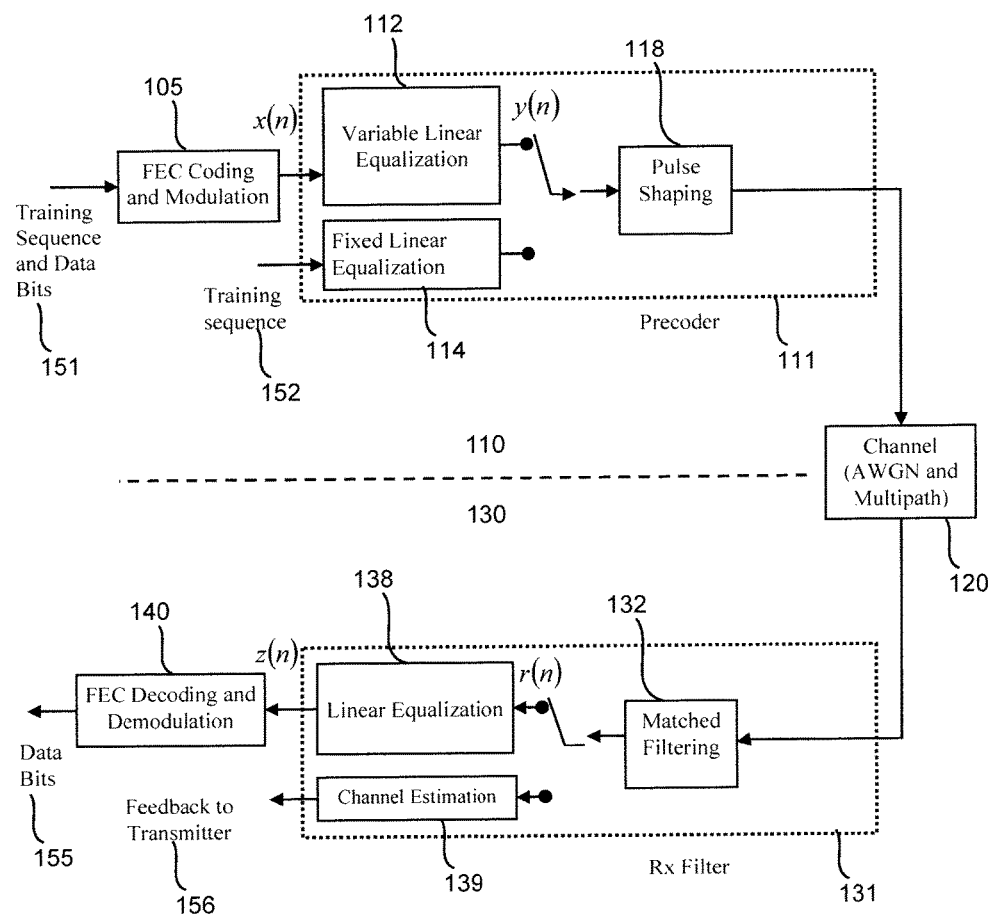
FIGS. 1A and 1B show schematic block diagrams of baseband communication systems according to the present disclosure.

FIG. 1A shows a schematic block diagram of a basic baseband communication system 100. The basic baseband communication system 100 includes a transmitter 110 which communicates via a channel 120 with a receiver 130.

In the system 100 linear equalization is performed in both the transmitter 110 and the receiver 130. More particularly, the transmitter 110 includes a variable linear equalizer 112 as well as a fixed linear equalizer 114, whereas the receiver 130 includes a linear equalizer 138 only.

The fixed linear equalizer 114 uses equalization coefficients that are fixed over time. More particularly, the equalization coefficients of the fixed linear equalizer 114 are pre-determined during installation and calibration of the system 100. In the simplest case, the impulse response of the fixed linear equalizer 114 is a delta function in the time domain (i.e. a constant 1 at each subcarrier in the frequency domain), when either calibration is omitted or the calibration result suggests a single coefficient of 1.

The variable linear equalizer 112 and the linear equalizer 138 use equalization coefficients that vary over time. The values of the varying equalization coefficients of the variable linear equalizer 112 are determined by the transmitter 110 using a feedback channel (not illustrated) from the receiver 130.

In the systems 100, a training sequence together with data symbols 151 are forward error coded (FEC) and modulated by module 105. The resulting data symbols x(n) are then input to the variable linear equalizer 112 to generate output symbols y(n). The output symbols y(n) are next provided to a pulse shaping filter 118 before the signal is transmitted over the channel 120.

At the receiver 130, the signal received from the channel 120 is first passed to a matched filter 132, which corresponds to the pulse shaping filter 118 of the transmitter 110. The output r(n) of the matched filter 132 is then input to the linear equalizer 138 to generate output symbols z(n). The output symbols z(n) are then provided to module 140 which applies FEC decoding and demodulation to provide output data bits 155. The output data bits 155 are processed for packet synchronization, channel estimation and other functions such as carrier frequency offset (CFO) estimation.

In a similar manner, a different training sequence 152 is input to the fixed linear equalizer 114, followed by pulse shaping by the pulse shaping filter 118. The resulting signal is then transmitted over the channel 120. In the receiver 130, the signal received from the channel 120 is also passed to the matched filter 132, before the resulting data symbols are input to a channel estimation module 139 which outputs data 156.

In the manner described in detail below, the varying equalization coefficients of the variable linear equalizer 112 and the linear equalizer 138 are determined using the training sequence added to the data 151 and 152 respectively. Channel state information (CSI), estimated at the receiver 130 using the training sequence 152, is fed back from the receiver 130 to the transmitter 110, and then used for computing the coefficients of the variable linear equalizer 112.

Figure 1B:
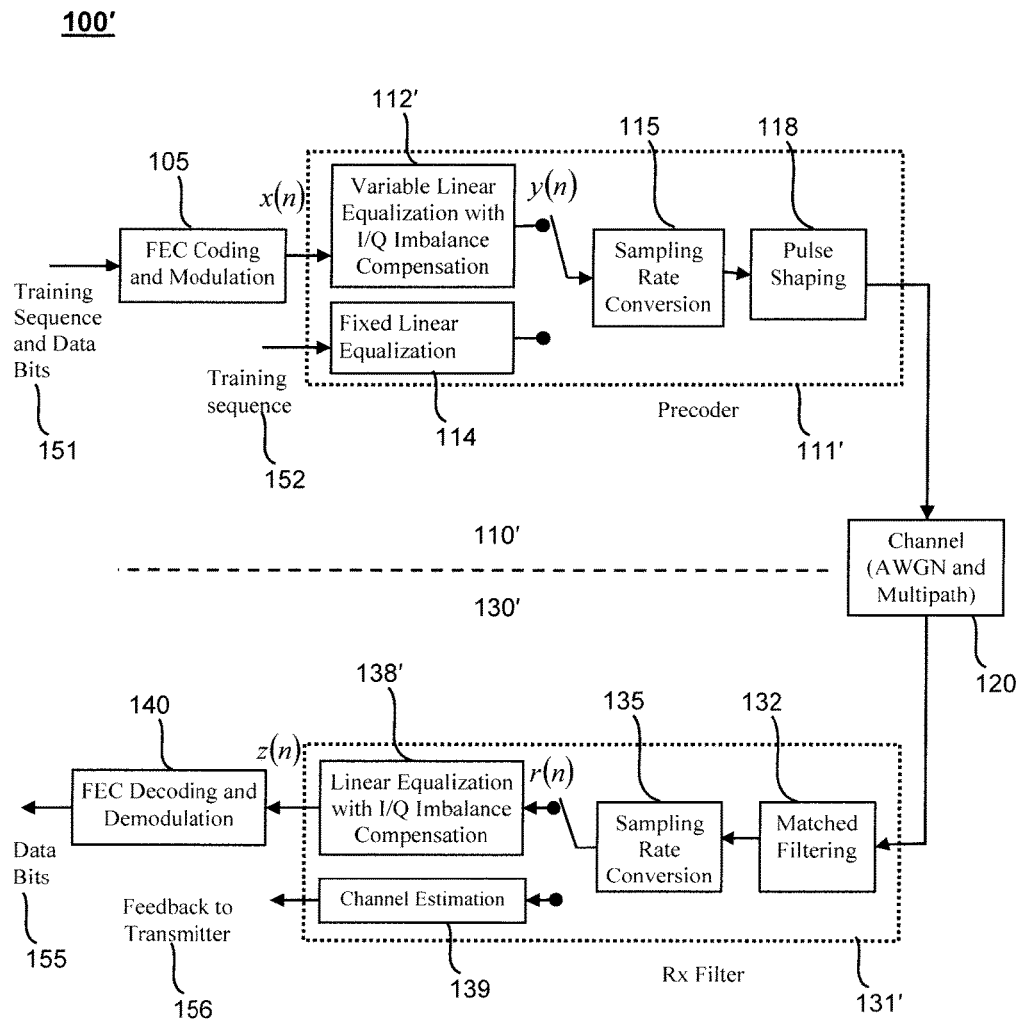

FIG. 1B shows a schematic block diagram of an extended baseband communication system 100'. The extended baseband communication system 100' has many elements in common with the basic baseband communication system 100 described above with reference to FIG. 1A. Accordingly, where reference is made to elements in FIG. 1B which have the same reference numerals used in FIG. 1A, those elements have for the purposes of this description the same function(s) or operation(s), unless the contrary intention appears.

Similar to the system 100 described above, the transmitter 110' of the system 100' includes a variable linear equalizer 112' as well as a fixed linear equalizer 114, whereas the receiver 130' includes a linear equalizer 138' only. However, the variable linear equalizer 112' of the transmitter 110' and the linear equalizer 138' of the receiver 130' combine channel equalization with in-phase (I) and quadrature (Q) channel (I/Q) imbalance compensation.

Another difference between the systems 100 and 100' is that the transmitter 110' of the system 100' includes a sampling rate conversion (SRC) module 115 which converts the symbols, output from the variable linear equalizer 112' or the fixed linear equalizer 114, from the symbol rate to a desired chip rate. Similarly, the receiver 130' of the system 100' includes another SRC module 135 which receives the output of the matched filter 132 and converts the symbols back from the chip rate to the symbol rate before the resulting data symbols are input to the linear equalizer 138', which also performs I/Q imbalance compensation, or the channel estimation module 139.

In the manner described in detail below, the I/Q imbalance parameters, as well as the varying equalization coefficients of the variable linear equalizer 112' and the linear equalizer 138', are determined using the training sequence added to the data 151 and 152 respectively. Channel state information (CSI), estimated at the receiver 130' using the training sequence 152', is fed back from the receiver 130' to the transmitter 110', and then used for computing the coefficients and I/Q imbalance parameters of the variable linear equalizer 112'.

Referring again to data 151 and 152, which respectively contains and consists of a respective training sequence, FIG. 3A illustrates a sequence of odd and even data frames. FIG. 3B illustrates the odd and even data frames in more detail. A physical-layer data frame typically consists of preamble, PHY header and data payload. The preamble of each data frame includes the training sequence. In principle, the training sequences may appear in any location of the data frames. In the disclosed systems 100 and 100', two different training sequences are used as the preambles of alternating frames. Accordingly, odd and even frames, odd and even preambles, and odd and even training sequences, are defined. The odd data frame, as well as the PHY header and data payload of the even data frame, are processed in the manner described for the training sequence and data symbols 151 with reference to FIG. 1A. The even preamble is processed in the manner described for training sequence 152. Hence, the data and preamble of the even frames use different equalizers 112 and 114 respectively.

The preferred training sequence described below is specifically designed to achieve the best I/Q imbalance estimation performance. The essential property required for such training sequences is that the frequency domain responses of the real and imaginary parts of the time domain signal are orthogonal. The training sequence in the discrete time domain at the symbol rate is denoted as:

$$x(n)=x_I(n)+jx_Q(n), \text{ for } n=0,1,\ldots,N_s-1 \quad (1)$$

wherein $j=\sqrt{-1}$ is the imaginary unit, $x_I(n)$ and $x_Q(n)$ are the real and imaginary parts of the training sequence x(n) respectively, and $N_s$ is the length of the training sequence x(n). Let $X_e(k)$ and $X_o(k)$ be the frequency responses at subcarrier k for the real part $x_I(n)$ and the imaginary part $x_Q(n)$ respectively. The orthogonality of the real and imaginary parts $x_I(n)$ and $x_Q(n)$ may then be denoted as either $X_e(k)X_o(k)=0$, with the frequency responses $X_e(k)$ and $X_o(k)$ not being zeros at the same time. Such a property is required to separate and estimate the I/Q imbalance in the frequency domain.

One example of constructing such a training sequence x(n) is as follows: Let X(k), k=0, 1, . . . , $N_s$-1 be real and only takes on a value +1 or −1 (for computational simplicity). Let $X_e(k)=X(k)$ for any even k and $X_e(k)=0$ for any odd k, and $X_o(k)=X(k)$ for any odd k and $X_o(k)=0$ for any even k. Let $x_I(n)$ and $x_Q(n)$ be the $N_s$-point inverse discrete Fourier transform (IDFT) of $X_e(k)$ and $X_o(k)$ respectively. $X(k)=X_e(k)+X_o(k)$ is then the DFT of $x(n)=x_I(n)+jx_Q(n)$.

The same training sequence as designed above can be used in both even and odd frames. For other purposes, such as identification of odd and even frames, different training sequences can also be used. For simplicity, it is assumed hereafter that the same sequence is used in both odd and even frames. However, it is noted that the processing applied to the sequence in the even and odd frames are different, as has been described before.

Figure 2A:
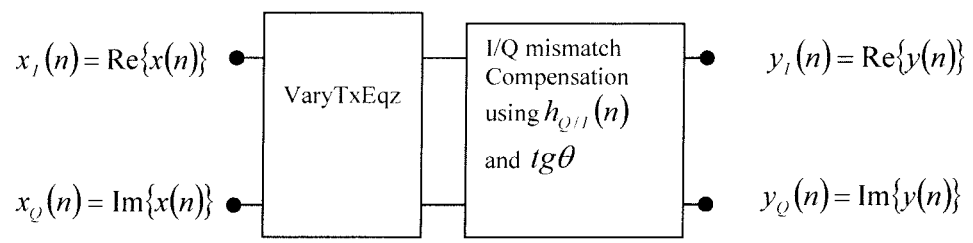
FIG. 2A illustrates a structure of a variable linear equalizer with I/Q imbalance compensation.

FIG. 2A illustrates the structure of the variable linear equalizer 112' of the transmitter 110' with I/Q imbalance compensation, both operating at the symbol rate. The variable linear equalizer receives as input the real $x_I(n)$ and imaginary parts $x_Q(n)$ of data symbols x(n), which are separately equalized. The I/Q imbalance compensation, which follows the equalization, is represented by parameters tg(θ) wherein β is the phase imbalance and tg( ) is the tangent function, and $h_{Q/I}(n)$ which is the frequency-dependent amplitude imbalance as is described in detail below.

Figure 2B:
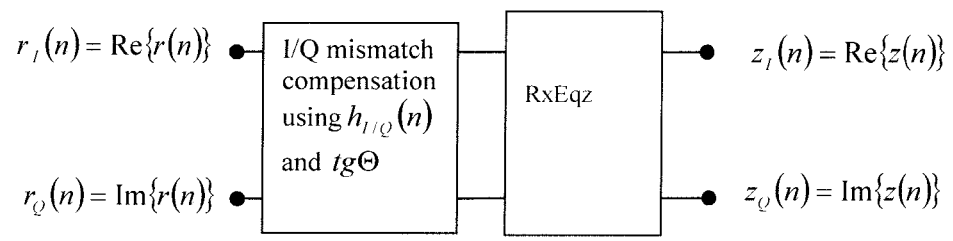
FIG. 2B illustrates a structure of a linear equalizer with I/Q imbalance compensation.

FIG. 2B illustrates the structure of the linear equalizer of the receiver 130' with I/Q imbalance compensation, also operating at symbol rate. The output r(n) of SRC module 135 is the input denoted as real $r_I(n)$ and imaginary parts $r_Q(n)$. In the receiver the I/Q imbalance is represented by parameters tg(Θ) where Θ is the phase imbalance and $h_{I/Q}(n)$ which is the frequency-dependent amplitude imbalance. The real and imaginary components of the received signal r(n) is firstly passed to the I/Q mismatch compensation module based on the estimates of tg(Θ) and $h_{I/Q}$ (n). The compensated signal is then processed by the receiver equalizer RxEqz in the manner described in detail below.

Estimating the I/Q imbalance parameters and the impulse response of the channel 120 is next described. As will be described, the odd preamble is used for estimating receiver side I/Q imbalance parameters (tg(Θ) and $h_{I/Q}(n)$) and the coefficients of the linear equalization performed by linear equalizer 138'. The even preamble on the other hand is used for estimating the transmitter side I/Q imbalance parameters (tg(θ) and $h_{Q/I}(n)$) and the coefficients of the variable linear equalization performed in variable linear equalizer 112' based on the estimation of the impulse response of the channel 120 which is fed back from the receiver 130' to the transmitter 110'.

Figure 4:
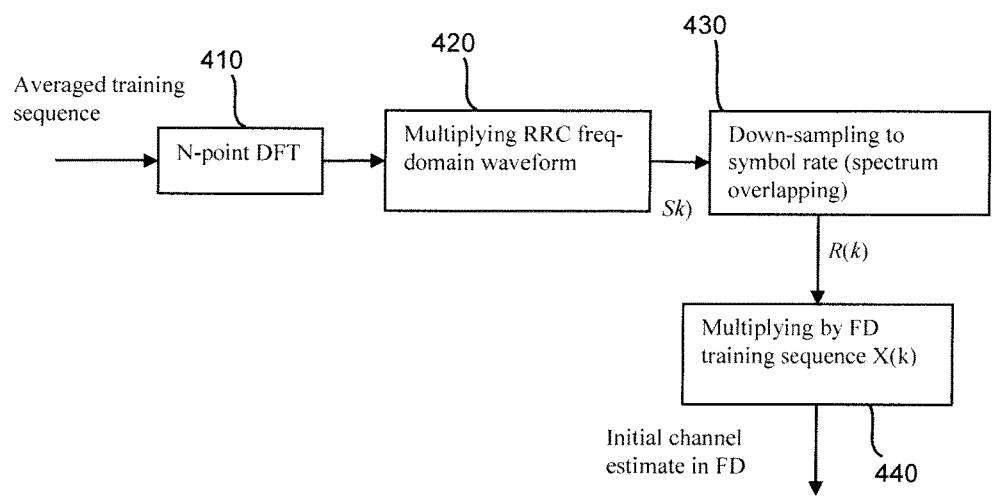
FIG. 4 shows a schematic flow diagram of a method for initial estimation of the channel shown in FIG. 1.

As was described with reference to FIG. 1B, the odd preamble is pre-equalized with I/Q imbalance compensation by the transmitter 110', and more particularly the variable linear equalizer 112'. After the signal is passed through the channel 120, an initial channel estimation is obtained in the frequency domain. FIG. 4 shows a schematic flow diagram of a method 400 for initial estimation of the channel 120 performed in the receiver 130'. The same method 400 is also applied to even frames. Hardware (processing) resources may thus be shared in an efficient implementation. The initial channel estimation obtained from even frames is fed back to the transmitter 110' for estimating the transmitter side I/Q imbalance parameters (tg(θ) and $h_{Q/I}(n)$) and the coefficients of the variable linear equalization at a predefined time interval.

Before describing the initial estimation of the impulse response of the channel 120 performed in method 400, the sampling rate conversion performed in module 115 is first described by way of an example. Assume a symbol rate of 3.75 Gsps and a chip rate of 5 Gsps. In the example K training sequences are used in each preamble. One training sequence serves as a cyclic prefix and will therefore absorb multipath interference from the previous frame at the receiver 130'. The training sequence at symbol rate has a length $N_s$, whereas the training sequence at chip rate has a length $$N = \frac{5}{3.75} N_s.$$

The matched filter 132 is assumed to be a root raised cosine (RRC) filter. For SRC from 5 Gsps to 3.75 Gsps, a polyphase filter bank consisting of three filters is required. Each filter is sampled at the chip rate 5 Gsps.

Referring to FIG. 4, after determining the synchronization point, a block of samples, averaged over the remaining K−1 training sequences, is input in step 410 to an N-point DFT. The output of step 410 is next multiplied in step 420 by a pre-computed RRC waveform in the frequency domain to apply the matched filtering of module 132, resulting in a N-point frequency domain received training signal S(k).

To convert the received training signal S(k) from the 5 Gsps chip rate to the 3.75 Gsps symbol rate, as is performed in the SRC module 135 of the receiver 130', the received training signal S(k) is down-sampled in step 430 to obtain a frequency domain training signal R(k) corresponding to an $N_s$ point time domain signal.

Figure 5:
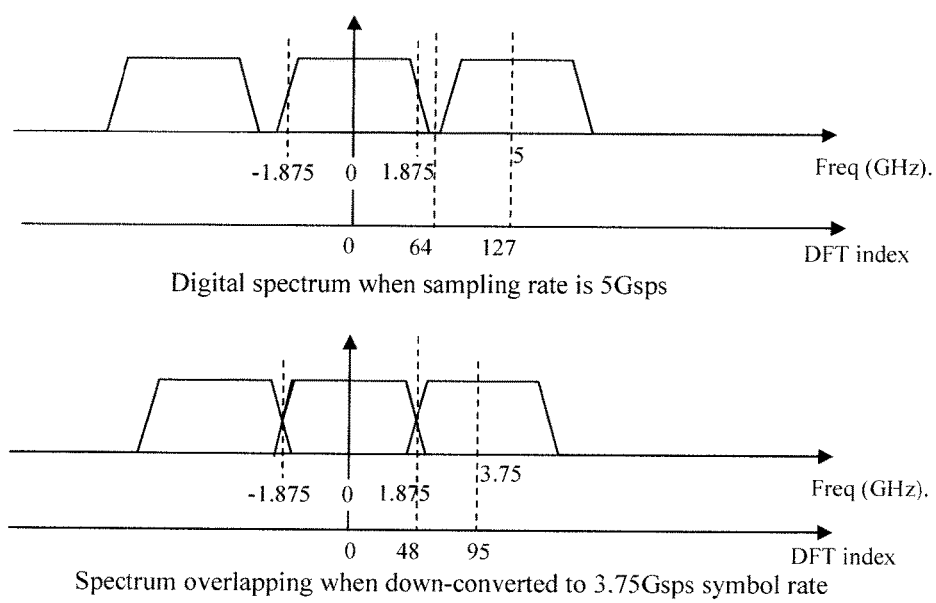
FIG. 5 illustrates the effect down-sampling on the spectrum of a training signal.

FIG. 5 illustrates the effect the down-sampling has on the spectrum of the training signal. More particularly, the down-sampling of the received training signal S(k) at the 5 Gsps chip rate to obtain the training signal R(k) at the 3.75 Gsps symbol rate causes overlap of the spectrum of the training signal R(k).

Note that the spectrum overlapping procedure in the channel estimation above is applicable to any other sampling rate conversion problem where the conversion ratio is a rational number. By changing the parameters of the sampling rate conversion, the width of the overlapped spectrum will change.

The down-sampling is mathematically represented as:

$$R(k) = \begin{cases} S(k), & k = 0, 1, \ldots, N_s - \frac{N}{2} - 1 \\ S(k) + S(k + N - N_s), & k = N_s - \frac{N}{2}, \ldots, \frac{N}{2} - 1 \\ S(k + N - N_s), & k = \frac{N}{2}, \ldots, N_s - 1 \end{cases} \quad (2)$$

Next, in step 440, the training signal R(k) is multiplied by the original training sequence X(k) in the frequency domain to obtain the initial channel impulse response as:

$$\tilde{H}(k) = R(k)X(k). \quad (3)$$

The inverse of the initial channel impulse response $\tilde{H}(k)$ can be directly used for equalization if no I/Q mismatch exists. Note that instead of using $1/\tilde{H}(k)$, which is essentially a least square equalization approach, the minimal ratio combining (MRC) approach may be used. Let $C(k)=S(k)X_5(k)$, k=0, 1, . . . , N−1, where $X_5(k)$ is the signal X(k) resampled at 5 Gsps. The MRC equalizer coefficients may then be represented as:

$$W(k) = \quad (4)$$

$$\begin{cases} \dfrac{C^*(k)}{|C(k)|^2 + |C(k + N - N_s)|^2}, & \text{for } k = N_s - \dfrac{N_b}{2}, \ldots, \dfrac{N_b}{2} \\[4pt] \dfrac{1}{C(k)}, & \begin{aligned} &\text{for } k = 0, 1, \ldots, N_s - \dfrac{N_b}{2} - 1 \\ &\text{and} \\ &k = N - N_s + \dfrac{N_b}{2} + 1, \ldots, N - 1 \end{aligned} \\[4pt] \dfrac{C^*(k)}{|C(k)|^2 + |C(k - N + N_s)|^2}, & \text{for } k = N - \dfrac{N_b}{2}, \ldots, N - N_s + \dfrac{N_b}{2} \end{cases}$$

where $N_b$ is a parameter related to the bandwidth of the pulse shaping filter. For example, $$N_b = \text{floor}\left(\frac{4.25}{5}N\right)$$

when the pulse shaping filter have an efficient bandwidth of 4.25 GHz. For the received frequency domain signal Y(k) at 5 Gsps, the process of MRC equalization and downsampling to 3.75 Gsps symbol rate may then be implemented as:

$$Z(k) = \begin{cases} W(k)Y(k), & k = 0, 1, \ldots, N_s - \frac{N}{2} - 1 \\ W(k)Y(k) + \\ W(k+N-N_s)Y(K+N-N_s), & k = N_s - \frac{N}{2}, \ldots, \frac{N}{2} - 1 \\ W(k+N-N_s)Y(k+N-N_s), & k = \frac{N}{2}, \ldots, N_s - 1 \end{cases} \quad (5)$$

Hereafter, the least square equalization will be used as an example, but extension to MRC equalization would be obvious to a person with general expertise in related areas.

Figure 12:
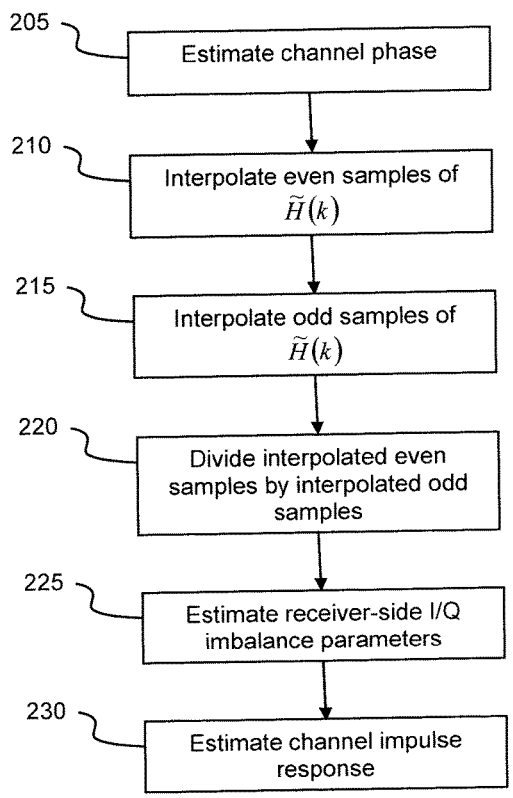
FIG. 12 shows a schematic flow diagram of a method, performed by a receiver of the system shown in FIG. 1, of estimating I/Q imbalance parameters and an impulse response of the channel.

FIG. 12 shows a schematic flow diagram of a method 200, performed by the receiver 130', of estimating the I/Q imbalance parameters used in the linear equalizer 138' and the impulse response of the channel 120. Method 200 starts in step 205 where a channel phase φ is estimated as:

$$\varphi = \sum_{k=0}^{N_s-1} \tilde{H}(k). \quad (6)$$

Step 210 follows where the even samples of the initial channel impulse response $\tilde{H}(k)$, k=0, 2, . . . , N−2, are interpolated to obtain $H_{even}(k)$. Similarly, in step 215, the odd samples of the initial channel impulse response $\tilde{H}(k)$, k=1, 3, . . . , $N_s$−1, are interpolated to obtain $H_{odd}(k)$. Next, in step 220, $H_{even}(k)$ is divided by $H_{old}(k)$ to obtain:

$$H_{old}(k) = H_{even}(k)/H_{odd}(k). \quad (7)$$

The receiver side I/Q imbalance parameters are then in step 225 estimated as:

$$tg(\Theta) = -\frac{\sum_k \mathrm{Im}\left\{\left(\frac{H_{e/o}(k) - jtg(\varphi)}{1 - jtg(\varphi)H_{e/o}(k)}\right)_o\right\}}{N_s} \quad (8)$$

$$H_{I/Q}(k) = \left(\frac{H_{e/o}(k) - jtg(\varphi)}{1 - jtg(\varphi)H_{e/o}(k)}\right)_e \quad (9)$$

wherein $(\bullet)_e$ and $(\bullet)_o$ denote the conjugate symmetric part and conjugate anti-symmetric part of the function in brackets respectively, and $H_{I/Q}(k)$ represents the DFT of the frequency-dependent amplitude imbalance $h_{I/Q}(n)$.

Finally, in step 230, the impulse response of the channel 120 is estimated as:

$$H(k) = [(1+jtg(\Theta))R_e(k) + R_o(k)H_{I/Q}(k)]X(k) \quad (10)$$

where $R_e(k)$ and $R_o(k)$ denote the conjugate symmetric part and conjugate anti-symmetric part of the training signal R(k) respectively.

The even training sequence is pre-equalized by the fixed linear equalizer 114 of the transmitter 110, without any I/Q imbalance compensation. After processing the equalized even training sequence by steps 410 and 420 of method 400 (FIG. 4), the received even training sequence in the frequency domain after SRC in step 430 is still denoted R(k) for convenience. In step 440 the initial channel impulse response is estimated as by the channel estimation module 139:

$$\tilde{H}(k) = R(k)X(k) \quad (11)$$

Figure 13:
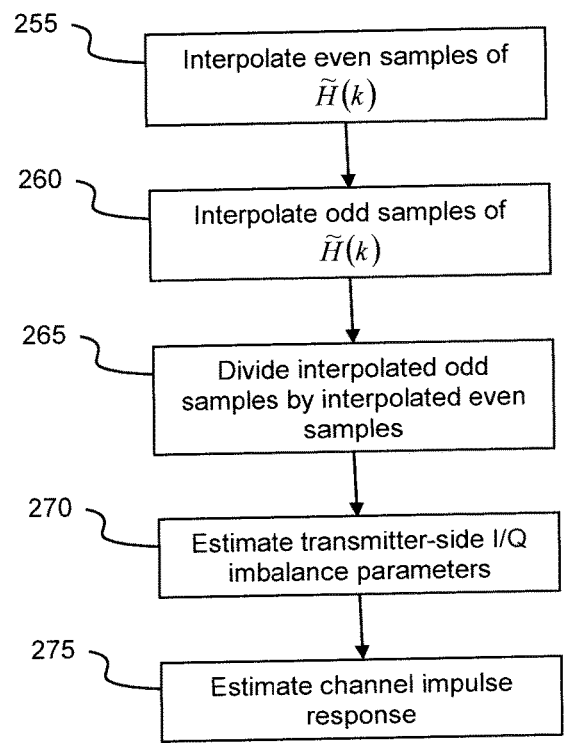
FIG. 13 shows a schematic flow diagram of a method, performed by a transmitter of the system shown in FIG. 1, of estimating I/Q imbalance parameters and refining the impulse response of the channel.

The initial channel impulse response $\tilde{H}(k)$ is then fed back to the transmitter 110 for estimating the I/Q imbalance parameters. FIG. 13 shows a schematic flow diagram of a method 250 of estimating the transmitter-side I/Q imbalance parameters and refining the channel impulse response H(k).

Method 250 starts in step 255 where the odd samples of the initial channel impulse response $\tilde{H}(k)$, k=1, 3, . . . , $N_s$−1, are interpolated to obtain $H_{odd}(k)$. In a similar manner, the even samples of the initial channel impulse response $\tilde{H}(k)$, k=0, 2, . . . , $N_s$−2, are interpolated in step 260 to obtain $H_{even}(k)$. In step 265 which follows $H_{odd}(k)$ is divided by $H_{even}(k)$ to obtain:

$$H_{o/e}(k) = H_{odd}(k)/H_{even}(k). \quad (12)$$

Next, in step 270, the I/Q imbalance parameters for use in the variable linear equalizer 112' are estimated as:

$$tg(\theta) = -\frac{\sum_k \mathrm{Im}\{(H_{o/e}(k))_e(H_{o/e}(k))_o^*\}}{\sum_k \|(H_{o/e}(k))_e\|^2} \quad (13)$$

$$H_{Q/I}(k) = \frac{1}{1 + tg^2(\theta)}\{(H_{o/e}(k))_e - jtg(\theta)(H_{o/e}(k))_o\} \quad (14)$$

wherein $H_{Q/I}(k)$ represents the DFT of the frequency-dependent amplitude imbalance $h_{Q/I}(n)$.

Finally, in step 275, the channel impulse response H(k) is refined by removing the I/Q mismatch as follows:

$$H(k) = \mathrm{even}\{\tilde{H}(k)H_{Q/I}(k)\} + \mathrm{odd}\left\{\tilde{H}(k)\frac{1 - jtg(\theta)}{1 + tg^2(\theta)}\right\} \quad (15)$$

wherein even{•} and odd{•} denote the operations of taking the even samples and odd samples of the function in brackets respectively.

In the preferred implementation post processing is performed in order to improve the accuracy of the I/Q imbalance parameters estimated at both the receiver 130' and the transmitter 110'. The post processing includes low-pass filtering the frequency-dependent amplitude imbalance $H_{I/Q}(k)$ (or $H_{Q/I}(k)$) to reduce the impact of unknown channels and averaging both the imbalance parameters tg(Θ) and $H_{I/Q}(k)$ (or both tg(θ) and $H_{Q/I}(k)$) over time to reduce the impact of noise.

Below is another I/Q imbalance estimation and compensation approach, which is different to that described above but also takes advantages of the multiple training sequences structure.

This approach treats I/Q imbalance as a 2×2 MIMO problem, where the I and Q channels at the transmitter 110' and receiver 130' are analysed independently. Thus there is a channel from I-transmit to I-receive, from I-transmit to Q-receive, from Q-transmit to Q-receive, and from Q-transmit to I-receive.

In one embodiment, each preamble consists of a sequence of 64 samples (with a 32 sample cyclic prefix). The I/Q imbalance is calculated in the frequency domain. A 64 point FFT converts the 64 transmitted or received samples into 64 frequencies. The 2×2 MIMO channel is calculated at each frequency.

As there is only a single received data point at a given frequency from a single preamble, a single preamble does not provide enough information to calculate the 2 channels I-I and channels. To overcome this without extending the preamble (which would be bad for latency), several successive preambles are used. The preambles must be different so that they do not provide redundant information. For n used preambles, at each frequency we have:

$$\begin{bmatrix} I_{tx}^0 & Q_{tx}^0 \\ \cdots & \cdots \\ I_{tx}^{n-1} & Q_{tx}^{n-1} \end{bmatrix} \begin{bmatrix} C_{II} & C_{IQ} \\ C_{QI} & C_{QQ} \end{bmatrix} = \begin{bmatrix} I_{rx}^0 & Q_{rx}^0 \\ \cdots & \cdots \\ I_{rx}^{n-1} & Q_{rx}^{n-1} \end{bmatrix} \quad (16)$$

where $C_{IQ}$ is the channel from I to Q. Providing n>=2, there is sufficient information to calculate the channel as follows:

$$\begin{bmatrix} C_{II} & C_{IQ} \\ C_{QI} & C_{QQ} \end{bmatrix} = \left( \begin{bmatrix} I_{tx}^0 & Q_{tx}^0 \\ \cdots & \cdots \\ I_{tx}^{n-1} & Q_{tx}^{n-1} \end{bmatrix} \right)^{-1} \begin{bmatrix} I_{rx}^0 & Q_{rx}^0 \\ \cdots & \cdots \\ I_{rx}^{n-1} & Q_{rx}^{n-1} \end{bmatrix} \quad (17)$$

where the pseudo-inverse of the transmitted signal matrix is used. Since the transmitted signal is known in advance, this inverse can be pre-calculated and stored in the firmware.

The use of more preambles (i.e. larger value for n) gives a more robust estimate of the channel, at the expense of a longer lag time between the data used for the calculation and the new I/Q imbalance being applied.

Note that since I and Q are real signals, the channel being calculated is conjugate symmetric in the frequency domain.

The 2×2 channel matrix is inverted and used in the equalization. It contains both I/Q imbalance and channel information, and hence replaces the separate channel estimation and I/Q imbalance in the first approach.

In order to reduce processing latency, a more efficient implementation may be achieved by combining the pre-equalization (with or without I/Q imbalance compensation), SRC, and pulse shaping in the transmitter 110' into one integrated transmitter filter, termed a precoder 111. More particularly, two precoders result, the first without I/Q imbalance compensation which includes the equalization performed by the fixed linear equalizer 114, and the second with I/Q imbalance compensation and equalization as performed by the variable linear equalizer 112. Similarly, the matched filtering, SRC, and equalization with I/Q imbalance compensation in the receiver 130' may be combined into a single integrated receiver filter, termed a RxFilter 131.

The RxFilter 131 and precoder 111 are implemented as respective filter banks, each with a number of polyphase filters depending on the SRC ratio. For the example case described above, with 3.75 Gsps symbol rate and 5 Gsps chip rate, the number of polyphase filters is 3, each being a time-shifted version of a base filter.

Figure 6A:
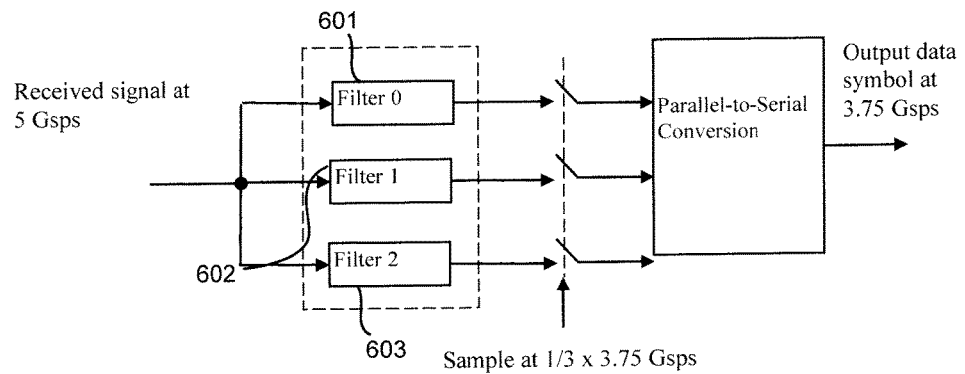
FIG. 6A shows a schematic block diagram of a structure of an RxFilter for an example case.

FIG. 6A shows a schematic block diagram of the structure of the RxFilter 131 for the example case. In this case, the length of each polyphase filter 601, 602 and 603 is less than, or equal to, the samples in one training sequence at 5 Gsps chip rate, e.g., N=128, the reason being that the hardware of the receiver 130 cannot afford to use an RxFilter 131 that is too long.

Figure 6B:
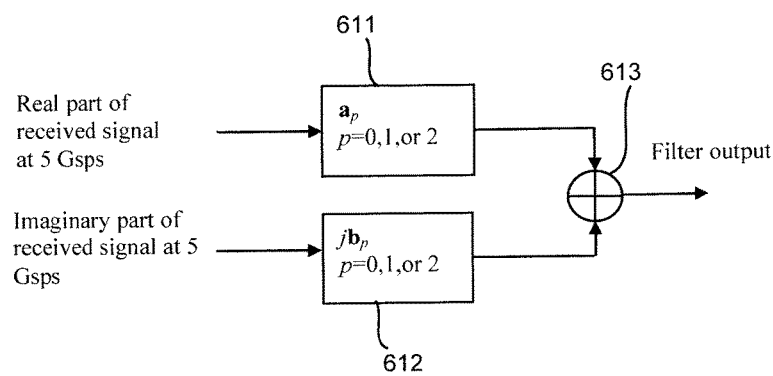
FIG. 6B shows a schematic block diagram of a structure of a polyphase filter.

FIG. 6B shows a schematic block diagram of the structure of a polyphase filter. The polyphase filter has two parts 611 and 612 represented by vectors $a_p$ and $b_p$ with filter index p=0, 1, or 2, and an adder 613 which adds the outputs from parts 611 and 612 to produce the output of the polyphase filter. The two parts $a_p$ and $jb_p$ are used for filtering the real part and imaginary part of the received signal at 5 Gsps respectively. The detailed process for calculating the two filter parts is described below.

First, the base filter's impulse responses for the two filter parts 611 and 612 are respectively calculated as:

$$A(k) = \frac{1 + jtg\Theta}{H(k)} \text{ and } B(k) = \frac{H_{I/Q}(k)}{H(k)} \text{ for} \quad (18)$$

$$k = 0, 1, \ldots, N_s - 1;$$

The $N_s$-point impulse responses A(k) and B(k) are then expanded to N-point vectors as:

$$A = A\left(\left[0:\frac{N}{2}-1, N_s - \frac{N}{2}:N_s - 1\right]\right) \text{ and} \quad (19)$$

$$B = B\left(\left[0:\frac{N}{2}-1, N_s - \frac{N}{2}:N_s - 1\right]\right) \quad (20)$$

which are composed of the 1$^{st}$ to $$\frac{N}{2}\text{-th and } \left(N_s - \frac{N}{2} + 1\right)\text{-th}$$

to $N_s$-th elements of impulse responses A(k) and B(k) respectively. This is due to the spectrum expansion in the process of sample rate conversion from 3.75 Gsps to 5 Gsps, as can be seen from FIG. 5:

RRC filtering and phase-shifting are next applied to vectors A and B, to obtain $$A_p = R_{rx} \cdot *A \cdot *\exp\left(j2\pi \frac{\left[0:\frac{N}{2}-1, -\frac{N}{2}:-1\right]}{N_s} p\right) \text{ and} \quad (21)$$

$$B_p = R_{rx} \cdot *B \cdot *\exp\left(j2\pi \frac{\left[0:\frac{N}{2}-1, -\frac{N}{2}:-1\right]}{N_s} p\right) \quad (22)$$

respectively, where ".*" denotes element-wise multiplication, $R_{rx}$ represents the 128-point frequency-domain response of the RRC filter, and $$\left[0:\frac{N}{2}-1, -\frac{N}{2}:-1\right]$$

denotes a vector with integer elements from 0 to $$\frac{N}{2} - 1$$

and from $$-\frac{N}{2} \text{ to } -1.$$

The two parts of each polyphase filter for p=0, 1, or 2, denoted as $a_p$ and $b_p$, are then obtained by converting vectors $A_p$ and $B_p$ to the time domain by applying N-point IDFT and then circularly shifting the IDFT outputs by a pre-designed number P, which is the length of the precursor part of the filters, such that the maximum tap is at P+1.

Finally, the filter length is truncated to the desired length, if required.

Figure 7:
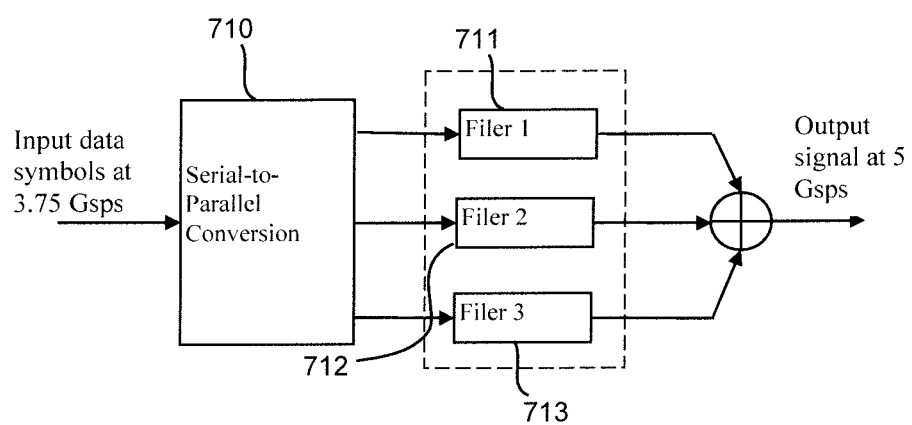
FIG. 7 shows a schematic block diagram of a structure of a precoder with I/Q imbalance compensation and equalization corresponding to the example case of FIG. 6A.

FIG. 7 shows a schematic block diagram of the structure of the precoder 111 with I/Q imbalance compensation and equalization as performed by the variable linear equalizer 112' according to the example case described above. The precoder 111 includes 3 polyphase filters 711, 712 and 713, and the filter length of each polyphase filter 711, 712 and 713, denoted as L at 5 Gsps chip rate or $$L_s = \frac{3.75}{5} L$$

at 3.75 Gsps symbol rate, is more than N or $N_s$ respectively. The structure of the polyphase filter is again that shown in FIG. 6B. For simplicity, the two filter parts are represented by vectors $a_p$ and $b_p$ with filter index p=0, 1, or 2 as before, but now $a_p$ and $jb_p$ are used for filtering the real part and imaginary part of the data symbols after serial-to-parallel conversion 710 respectively. The precursor length of the filters 711, 712 and 713 at 5 Gsps chip rate is denoted as P. The corresponding precursor length at 3.75 Gsps is thus $$P_s = \frac{3.75}{5} P.$$

The detailed process for calculating the two filter parts is described below.

Firstly, the time domain channel impulse h(n) and the frequency-dependent amplitude I/Q imbalance $h_{Q/I}(n)$ represented in time domain are calculated by performing $N_s$-point IDFT to the estimated channel impulse response H(k) and frequency-dependent amplitude I/Q imbalance $H_{Q/I}(n)$ in the frequency domain.

The channel impulse h(n) and frequency-dependent amplitude I/Q imbalance $h_{Q/I}(n)$ are zero-padded to obtain h'(n) and $h'_{Q/I}(n)$ of length $L_s$ as:

$$h'(n) = \begin{cases} h(n), & n = 0, 1, \ldots, N_s - P_s - 1 \\ 0, & n = N_s - P_s, \ldots, L_s - P_s - 1 \\ h(n - L_s + N_s), & n = L_s - P_s, \ldots, L_s - 1 \end{cases} \quad (23)$$

$$h'_{Q/I}(n) = \begin{cases} h_{Q/I}(n), & n = 0, 1, \ldots, N_s - P_s - 1 \\ 0, & n = N_s - P_s, \ldots, L_s - P_s - 1 \\ h_{Q/I}(n - L_s + N_s), & n = L_s - P_s, \ldots, L_s - 1 \end{cases} \quad (24)$$

Next, h'(n) and $h'_{Q/I}(n)$ are converted to the frequency-domain by applying $L_s$-point FFT as H'(k) and $H'_{Q/I}(n)$ respectively.

The base filter's impulse responses for the two filter parts are respectively calculated as:

$$A(k) = \left(\frac{1}{H'(k)}\right)_e H'_{Q/I}(k) + (1 - jtg(\theta)H'_{Q/I}(k))\left(\frac{1}{H'(k)}\right)_o, \text{ and} \quad (25)$$

$$B(k) = \left(\frac{1}{H'(k)}\right)_o H'_{Q/I}(k) + (1 - jtg(\theta)H'_{Q/I}(k))\left(\frac{1}{H'(k)}\right)_e \quad (26)$$

for $k = 0, 1, \ldots, L_s - 1$.

The $L_s$-point impulse responses A(k) and B(k) are expanded to L-point vectors as:

$$A = A\left(\left[0:\frac{L}{2} - 1, L_s - \frac{L}{2}:L_s - 1\right]\right) \text{ and} \quad (27)$$

$$B = B\left(\left[0:\frac{L}{2} - 1, L_s - \frac{L}{2}:L_s - 1\right]\right) \quad (28)$$

which are composed of the $1^{st}$ to $$\frac{L}{2}\text{-th and } \left(L_s - \frac{L}{2} + 1\right)\text{-th}$$

to $L_s$-th elements of impulse responses A(k) and B(k) respectively due to the spectrum expansion in the process of sample rate conversion from 3.75 Gsps to 5 Gsps.

RRC filtering and phase-shifting are applied to vectors A and B, and obtain $$A_p = R_{tx} \cdot *A \cdot *\exp\left(j2\pi \frac{\left[0:\frac{L}{2} - 1, -\frac{L}{2}:-1\right]}{L_s} p\right) \text{ and} \quad (29)$$

$$B_p = R_{tx} \cdot *B \cdot *\exp\left(j2\pi \frac{\left[0:\frac{L}{2} - 1, -\frac{L}{2}:-1\right]}{L_s} p\right) \quad (30)$$

respectively, where ".*" denotes element-wise multiplication, $R_{tx}$ represents the L-point frequency-domain response of the RRC filter, and $$\left[0:\frac{L}{2} - 1, -\frac{L}{2}:-1\right]$$

denotes a vector with integer elements from 0 to $$\frac{L}{2} - 1$$

and from $$-\frac{L}{2} \text{ to } -1.$$

The two parts of each polyphase filter for p=0, 1, or 2, denoted as $a_p$ and $b_p$ are obtained by converting the vectors $A_p$ and $B_p$ to the time domain by applying L-point IDFT and then circularly shifting the IDFT outputs by the precursor length P.

It is noted that the value of precursor length P is chosen such that no significant power in the variable linear equalization precoder and receiver side linear equalization is truncated.

The filters for the fixed linear equalization precoder may be computed similarly to those of the variable linear equalization precoder described above, but using a fixed channel impulse response obtained by initial system calibration and without considering I/Q imbalance compensation. The initial value of the variable linear equalization precoder may be set similarly to the fixed linear equalization precoder.

Figure 8:
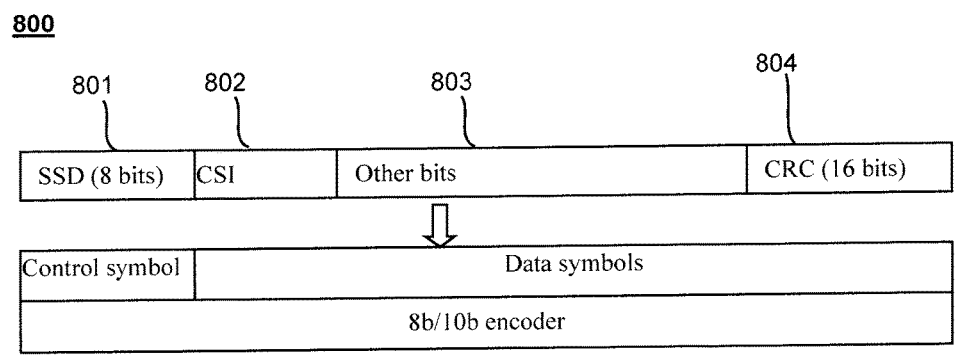
FIG. 8 shows a packet fed back from the receiver to the transmitter.

As is described above with reference to FIG. 1A, CSI, estimated at the receiver 130 using the training sequence 152, is fed back from the receiver 130 to the transmitter 110, and then used for computing the coefficients and I/Q imbalance parameters of the variable linear equalizer 112. The CSI, together with other information that needs to be sent back, forms a packet 800 as shown in FIG. 8. The packet 800 consists of a stream start delimiter (SSD) 801, the CSI 802, other information bits 803, and a 16 bit CRC check 804.

The SSD 801 is used by the transmitter 110 (which is the receiver of the packet 800) for detecting the start of the stream, and is a fixed 8-bit sequence. Before transmitting, the packet 800 is encoded by an 8b/10b line code that maps 8-bit symbols to 10-bit symbols to achieve DC-balance and bounded disparity, and to allow packet synchronization and reasonable clock recovery. The SSD 801 is treated as a control symbol, and encoded following, e.g., the K. 28.5 rule in the 8b/10b code. Packet synchronization can then be referred to the encoded SSD symbol because of its uniqueness in the coded stream.

The CSI packet 800 is typically sent to the transmitter 110 by using dedicated feedback channels. However, in a full-duplex system having two transceivers in communication with each other, according to the present disclosure feedback bits are modulated with the preamble of the data frames being communicated to the other transceiver for use in its transmitter 110, and hence does not require overhead for feedback. The speed of feedback is slower, but it has zero overhead.

Figure 9:
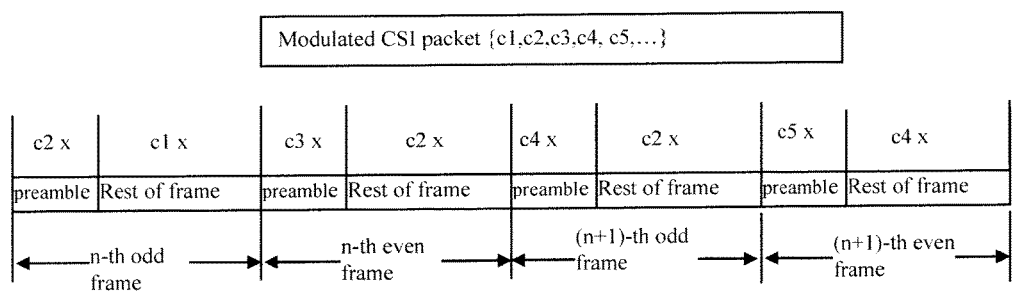
FIG. 9 illustrates modulating feedback bits with a preamble of data frames.

Each bit in the feedback packet 800 is binary phase shift key (BPSK) modulated to be either symbol 1 or −1, and is multiplied to the preamble in each frame. As is illustrated in FIG. 9, the symbol multiplied to the n-th odd frame is also multiplied to the coded and modulated data payload in the n-th even frame and the (n+1)-th odd frame. This is to avoid the {1,−1}-ambiguity in equalization.

Figure 10:
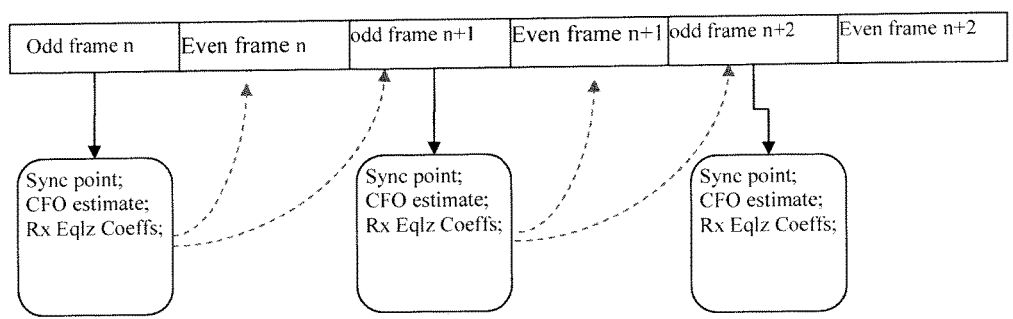
FIG. 10 illustrates implementing baseband processing over the period of a current frame, and applying the results of the processing to the next two frames, instead of the current frame.

In very high speed communications, some baseband processing, such as synchronization, CFO estimation, channel estimation and generating receiver equalization coefficients, may not be able to be completed in time due to the processing requirements at the receiver 130. For applications where the channel 120 remains unchanged (or the change is small) over a few frames, this baseband processing is implemented over the period of the current frame. The results are then applied to the next frame. In particular, for the proposed frame structure described with reference to FIG. 3 where odd and even frames are transmitted alternately, as is illustrated in FIG. 10, the processing is done over the entire odd frame. The results of the processing are applied to the next two frames, instead of the current frame.

Figure 11:
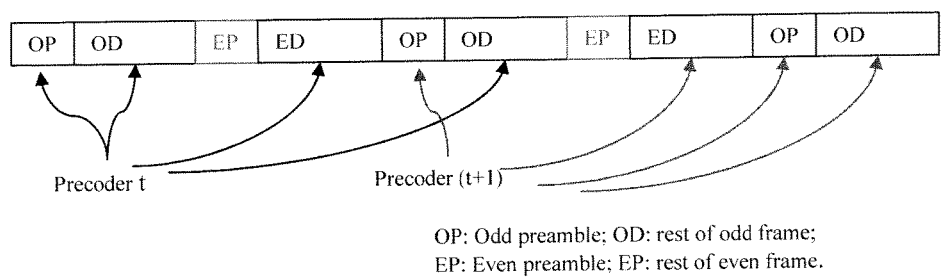
FIG. 11 illustrates a special precoding structure used in the processing illustrated in FIG. 10.

Since the RxFilter computed from the channel estimates obtained from an odd preamble will be used for the next two frames, a specific precoding structure is used to avoid these coefficients become incorrect when the precoder in the transmitter is changed. That precoding structure is illustrated in FIG. 11. When a precoder is to be updated, precoder (t+1) is first applied to the odd preamble of the current frame, while precoder (t) is still applied to the rest of this frame. For the following frames, only precoder (t+1) is applied.

At the receiver 130, the channel 120 over consecutive frames generally changes insignificantly, and hence equalization coefficients over consecutive frames derived from channel estimates are also similar. However, there will always be minor clock differences between the transmitter 110 and receivers 130 at different nodes. The minor clock difference over a long period will cause the change of synchronization point. When the change is small, no adjustment is necessary, only if the same synchronization point and equalization coefficients are used with the previous frame. However, when such an accumulated timing drift is significantly large, the synchronization point needs to be adjusted to make sure at least the signals used for the channel estimation is always part of the preamble. When it is decided to adjust the synchronization by K samples, the channel estimates are multiplied by a phase shifting sequence $\exp(j2\pi K [0, 1, \ldots, N_s-1]/N_s)$, where K may be positive or negative, depending on how the phase is shifted.

Figure 14:
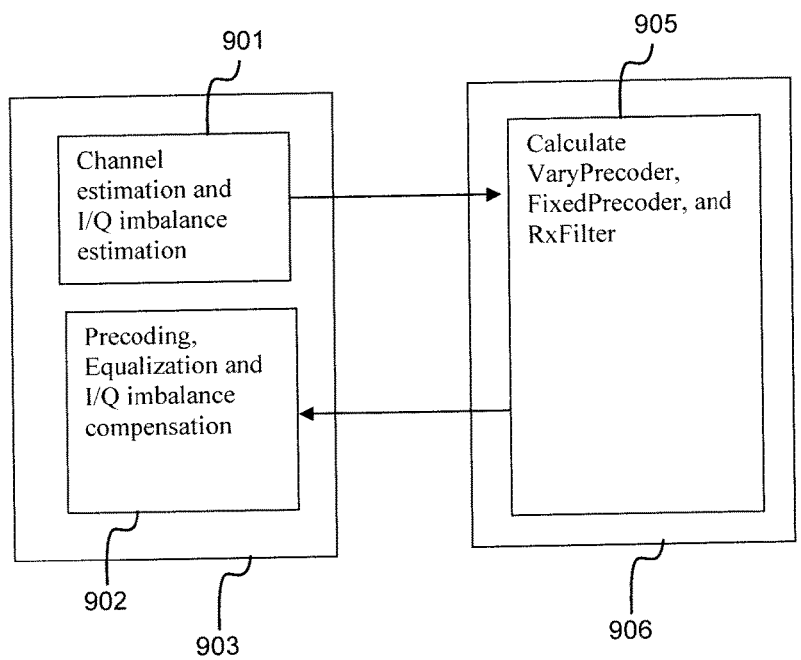
FIG. 14 shows a configuration in which the system disclosed herein is implemented both in a combined field-programmable gate array and a personal computer.

All the processing described above, including channel estimation. I/Q imbalance parameter estimation and compensation, computation of the variable linear equalization precoder, the fixed linear equalization precoder and RxFilter can be implemented flexibly in a combined field-programmable gate array (FPGA) and general purpose processors (such as a personal computer (PC)). FIG. 14 shows one possible configuration 900, which considers both the fast processing capability of FPGA and the powerful computational capability of PCs. In that configuration 900 the channel estimation and I/Q imbalance parameter estimation are performed in a module 901 implemented in a FPGA 903. The computation of the variable linear equalization precoder, the fixed linear equalization precoder and RxFilter is then performed in module 905 implemented in a PC. Finally, precoding, equalization and I/Q imbalance compensation are performed in module 902, also implemented in the FPGA 903.

The foregoing describes only some embodiments of the present invention, and modifications and/or changes can be made thereto without departing from the scope and spirit of the invention, the embodiments being illustrative and not restrictive.

The claims defining the invention are as follows:

1. A communication system comprising:
   a transmitter for transmitting frames, at least two consecutive frames containing different training sequences, the transmitter comprising:
   a time variable linear equalizer for applying equalization to at least a first training sequence to produce an equalized first training sequence; and
   a fixed linear equalizer for applying equalization to a second training sequence to produce an equalized second training sequence; and
   a receiver for receiving data communicated from the transmitter over a channel, the receiver combining and jointly processing the at least two consecutive frames transmitted by the transmitter to estimate a channel state of the channel, the receiver comprising:
   a receiver linear equalizer for receiving the equalized first training sequence, for applying equalization thereto, and for estimating equalization coefficients to be used by the receiver linear equalizer in future equalization; and
   a channel estimator for receiving the equalized second training sequence, and for estimating the channel state of the channel,
   wherein the channel state is fed back to the transmitter which estimates from the channel state equalization coefficients to be used for generating the coefficients of the time variable linear equalizer.

2. A communication system according to claim 1 wherein the time variable linear equalizer of the transmitter further applies equalization to a data payload to produce an equalized data payload and, upon receipt of the equalized data payload by the receiver, the receiver linear equalizer further applies equalization to the equalized data payload.

3. A communication system according to claim 1 wherein:
the time variable linear equalizer and the receiver linear equalizer further perform I/Q mismatch compensation;
the receiver linear equalizer further estimates parameters to be used for the I/Q mismatch compensation in the receiver linear equalizer from the equalized first training sequence; and
the transmitter further estimates parameters to be used for the I/Q mismatch compensation in the time variable linear equalizer from the channel state fed back from the receiver.

4. A communication system according to claim 3 wherein the I/Q mismatch compensation is performed using linear filters.

5. A communication system according to claim 1 wherein the equalization applied to the second training sequence by the fixed linear equalizer has a constant impulse response in the frequency domain.

6. A communication system according to claim 1 wherein the first and second training sequences are orthogonal in the frequency domain.

7. A communication system according to claim 1 wherein the channel state is fed back to the transmitter over a return channel.

8. A method for performing equalization in a communication system, the method comprising the steps of:
applying equalization to at least a first training sequence by a time variable linear equalizer of a transmitter to produce an equalized first training sequence;
transmitting by the transmitter the equalized first training sequence to a receiver over a channel;
applying equalization to the equalized first training sequence by a receiver linear equalizer to produce first data;
estimating equalization coefficients to be used by the receiver linear equalizer in future equalization from the first data;
applying equalization to a second training sequence by a fixed linear equalizer of the transmitter to produce an equalized second training sequence;
transmitting by the transmitter the equalized second training sequence to the receiver over the channel;
estimating a channel state of the channel in the receiver from the equalized second training sequence;
feeding back the channel state to the transmitter from the receiver; and
estimating from the channel state equalization coefficients to be used for generating the coefficients of the time variable linear equalizer in future equalization.

9. A method according to claim 8 further comprising the steps of:
applying, by the time variable linear equalizer of the transmitter, equalization to a data payload to produce an equalized data payload;
transmitting the equalized data payload by the transmitter to the receiver over the channel; and
applying, by the receiver linear equalizer, equalization to the equalized data payload.

10. A method according to claim 8 wherein the time variable linear equalizer and the receiver linear equalizer further perform I/Q mismatch compensation, and the method further comprises the steps of:
estimating by the receiver linear equalizer parameters to be used for the I/Q mismatch compensation in the receiver linear equalizer from the equalized first training sequence; and
estimating by the transmitter further parameters to be used for the I/Q mismatch compensation in the time variable linear equalizer from the channel state fed back from the receiver.

11. A method according to claim 8 wherein the channel state is fed back to the transmitter from the receiver over a return channel.

12. A transmitter comprising:
a time variable linear equalizer for applying equalization to a first training sequence and a data payload; and
a fixed linear equalizer for applying equalization to a second training sequence.

13. A transmitter according to claim 12 wherein each of the time variable linear equalizer and the fixed linear equalizer further comprises a pulse shaping filter.

14. A transmitter according to claim 12 wherein each of the time variable linear equalizer and the fixed linear equalizer further comprises a sampling rate convertor for converting symbols from a symbol rate to a chip rate.

15. A transmitter according to claim 12 wherein the time variable linear equalizer further performs I/Q mismatch compensation.

* * * * *

UNITED STATES PATENT AND TRADEMARK OFFICE
CERTIFICATE OF CORRECTION

PATENT NO. : 10,237,095 B2
APPLICATION NO. : 15/512884
DATED : March 19, 2019
INVENTOR(S) : Joseph Abraham Pathikulangara et al.

Page 1 of 1

It is certified that error appears in the above-identified patent and that said Letters Patent is hereby corrected as shown below:

In the Specification

Column 9, Line 36, "$H_{old}(k)=H_{even}(k)/H_{odd}(k)$" should be ---$H_{e/o}(k)=H_{even}(k)/H_{odd}(k)$---.

Signed and Sealed this
Eighth Day of October, 2019

Andrei Iancu
*Director of the United States Patent and Trademark Office*